US012783705B2

(12) United States Patent
Paczkowski

(10) Patent No.: US 12,783,705 B2
(45) Date of Patent: Nov. 3, 2026

(54) DATA CENTER STORAGE INTEGRATION WITH CORE NETWORK

(71) Applicant: T-Mobile Innovations LLC, Overland Park, KS (US)

(72) Inventor: Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 154 days.

(21) Appl. No.: 18/797,419

(22) Filed: Aug. 7, 2024

(65) Prior Publication Data

US 2026/0044617 A1 Feb. 12, 2026

(51) Int. Cl.

*G06F 21/62* (2013.01)
*G06F 21/57* (2013.01)
*H04L 9/06* (2006.01)

(52) U.S. Cl.

CPC ........ *G06F 21/6218* (2013.01); *G06F 21/577* (2013.01); *H04L 9/0643* (2013.01); *G06F 2221/034* (2013.01)

(58) Field of Classification Search

None
See application file for complete search history.

(56) References Cited

U.S. PATENT DOCUMENTS

| | | | | |
|---|---|---|---|---|
| 9,276,860 | B2 * | 3/2016 | Kim | H04L 47/125 |
| 10,068,097 | B2 * | 9/2018 | Ohrimenko | H04L 9/14 |
| 2012/0290787 | A1 * | 11/2012 | Ito | G06F 11/2074 711/E12.019 |
| 2014/0280818 | A1 * | 9/2014 | Kim | G06F 9/505 709/223 |
| 2015/0006609 | A1 * | 1/2015 | Sampath | H04L 67/562 709/202 |
| 2016/0105502 | A1 * | 4/2016 | Shen | H04L 45/02 709/205 |
| 2016/0239683 | A1 * | 8/2016 | Gujral | G06F 21/6272 |
| 2021/0344743 | A1 * | 11/2021 | Kwon | H04L 63/0464 |
| 2022/0239466 | A1 * | 7/2022 | Nenov | H04L 9/0637 |

* cited by examiner

*Primary Examiner* — Lashonda Jacobs-Burton

(57) ABSTRACT

A data center storage system integrated into a core network. The system comprises a plurality of data centers that each provides a memory storage; a plurality of optical fiber communication links, wherein each optical communication link communicatively couples two of the data centers to each other, wherein the memory storage of the data centers stores a plurality of files, wherein each file is identified by a hash calculated over the content of the file, wherein a distributed hash table is stored in the memory storage of each data center that associates hashes of files to a memory storage location where the files are stored, and wherein at least some of the files are distributed across each of the plurality of data centers, whereby a vulnerability to hacking the files is decreased, and wherein each data center is connected to the core network.

20 Claims, 5 Drawing Sheets

DATA CENTER STORAGE INTEGRATION WITH CORE NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises and organizations often have needs to store large amounts of data. It may be desirable to keep this data secure and confidential. At the same time, it may be desirable to be able to access this data quickly. Because such data may be vital to an enterprise's business success, it is desirable that the enterprise own and possess its data in a definite way. Sometimes enterprises prefer to store large amounts of their proprietary data in third party storage, such as in hyperscalar cloud computing systems. But this may mean that, in a serious way, they don't really possess its own data in the same way that they would if they stored the data on their own proprietary computer systems to which they retained direct, administrative control over.

SUMMARY

In an embodiment, a data center storage system integrated into a core network is disclosed. The system comprises a plurality of data centers, wherein each data center provides a memory storage and each data center is at least 10 miles away from the nearest adjacent other data center; and a plurality of optical fiber communication links, wherein each optical communication link communicatively couples two of the data centers to each other. The memory storage of the data centers stores a plurality of files, wherein each file is identified by a hash calculated over the content of the file, wherein a distributed hash table is stored in the memory storage of each data center that associates hashes of files to a memory storage location where the files are stored. Each data center is connected to the core network, whereby the memory storage of the data centers is made available as a user plane function service to end users.

In another embodiment, a data center storage system integrated into a core network is disclosed. The system comprises a plurality of data centers, wherein each data center provides a memory storage and each data center is at least 10 miles away from the nearest adjacent other data center; and a plurality of optical fiber communication links, wherein each optical communication link communicatively couples two of the data centers to each other. The memory storage of the data centers implements an interplanetary file system (IPFS) and stores a plurality of files, wherein each file is identified by a hash calculated over the content of the file. A distributed hash table is stored in the memory storage of each data center that associates hashes of files to a memory storage location where the files are stored, and at least some of the files are distributed across each of the plurality of data centers, whereby a vulnerability to hacking the files is decreased. Each data center is connected to the core network.

In yet another embodiment, a data center storage system integrated into a core network is disclosed. The system comprises a plurality of data centers, wherein each data center provides a memory storage and each data center is at least 10 miles away from the nearest adjacent other data center and a plurality of optical fiber communication links, wherein each optical communication link communicatively couples two of the data centers to each other. The memory storage of the data centers stores a plurality of files, wherein each file is identified by a hash calculated over the content of the file, wherein a distributed hash table is stored in the memory storage of each data center that associates hashes of files to a memory storage location where the files are stored. Each data center executes an optical fiber communication link failure application that detects when an optical fiber communication link between the data center and an adjacent data center is failed and re-establishes a communication link with the adjacent data center via an alternate optical fiber communication link. Each data center is connected to the core network, whereby the memory storage of the data centers is made available as a user plane function service to end users.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
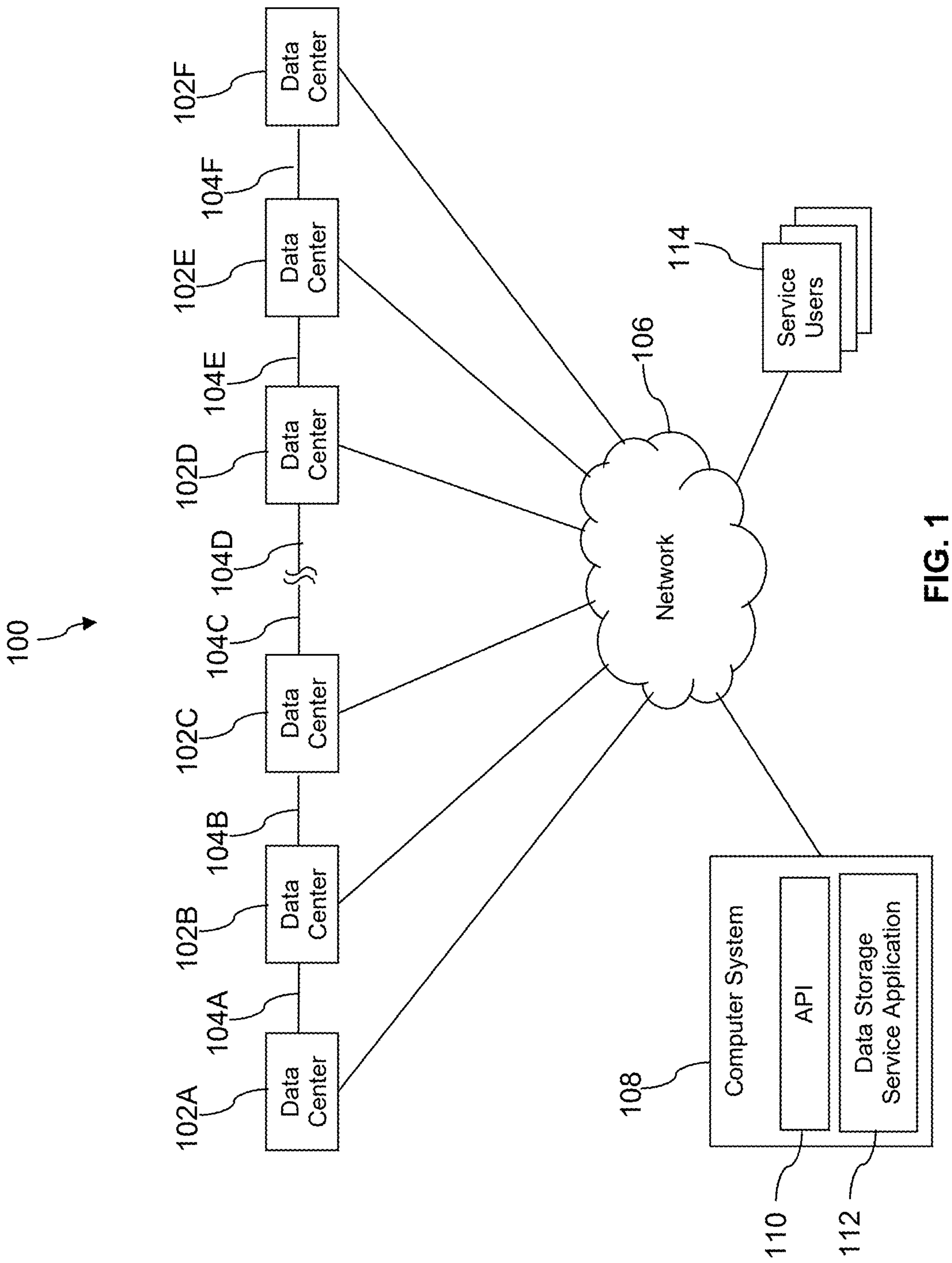
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a data storage system integrated into the user plane of a core network. The data storage system comprises a plurality of data centers co-located with repeaters of a fiber optic communication network. To maintain the accuracy of optical signals in fiber optic networks, repeaters are located periodically along fiber optic communication links to receive the optical signal, convert the optical signal into a digital electronic signal, reconstitute the original digital signal (e.g., perform error correction when needed), and retransmit the optical signal based on the reconstituted digital signal down the next segment of the fiber optic communication link. The existing fiber optic communication networks in the United States are underutilized. Some estimates are that most fiber optic communication paths carry only 4% of their true capacity. Co-locating data centers with fiber optic repeaters promotes better utilizing this idle fiber optic communication infrastructure while also supporting other benefits described below. In an embodiment, the data centers are communicatively coupled to a mesh network of a core network. If a fiber optic communication link between two data centers fails, a link health monitoring application executing at the two data centers can each independently identify the link failure and dynamically reroute their communication via a different path of the mesh network.

The data centers collectively establish a distributed data store. Data from users (e.g., business enterprises) can be stored in mass data storage incorporated within the data centers. In an embodiment, the data memory storage of the data centers establishes an interplanetary file system (IPFS) wherein data items are stored using what may be referred to as content addressing. The name of each data item is determined as a cryptographic hash of the entire content of the data item. The data centers each stores a distributed hash table that associates each content address of a data item (e.g., the cryptographic hash of the entire content of that data item) to a storage location within the distributed data store. Employing content addressing in effect makes the data items immutable, as changed content entails a different content address-a different handle for retrieving the data item.

Each data center of the system stores a copy of the distributed hash table, and when the distributed hash table is updated (e.g., a new data item is added or an existing data item is deleted), all the data centers of the system have their distributed hash table updated. When a user requests access to a data item by presenting the content address of the data item, the system consults the distributed hash table to map the content address to the storage location of the given data item, retrieves the data item, and sends a copy of the data item to the user.

In an embodiment, the data items stored by users may be partitioned and the partitions stored in the data memory storage of a plurality of different ones of the data centers. This partitioning of the data can support more rapid retrieval of the data items. Additionally, this partitioning of the data can reduce the vulnerability of the data items from hacking or unauthorized access to the data items by cyber attackers. The distribution of the partitions of a given data item can be indicated in the distributed hash table entry for the data item. Some users may choose to have one or more of their data items not partitioned and instead to be stored at a particular one of the data centers, for example a data center located closest to an office of the user.

In an embodiment, the data storage system is implemented as a User Plane Function (UPF) of the core network. Users may access the data storage system via an Application Function (AF) coupled to the core network or through an N3 Interworking Function (N3IWF). The data storage system provides a particular technical solution to the technical problem of storing large amounts of data by enterprises or organizations in a third-party system while retaining viable proprietorship of their own data. By contrast, centralized data storage relying on third-party cloud providers may entail unviable proprietorship of user-owned data (e.g., users can scarcely be said to have proprietary control of their own data when it is stored "in the cloud" and they have no administrative rights over the storage hardware "in the cloud"). The data storage system disclosed herein can provide a lower cost technical solution to distributed data storage because underutilized fiber optic communication links are leveraged.

Turning now to FIG. 1, a system 100 is described. In an embodiment, the system 100 comprises a plurality of data centers 102A-102F communicatively coupled with each other via optical fiber communication links 104. The optical fiber communication links may be part of a fiber optic communication network. The system 100 comprises a network 106 that provides connectivity between a computer system 108, service users 114, and the data centers 102. The computer system 108 may be operated by a data storage service provider. The computer system 108 may provide an application programming interface (API) 110 extended to service users 114 to store and access data items in the data centers 102 via the computer system 108. The computer system 108 may execute a data storage service application 112 to provide data storage services to the service users 114. In an embodiment, the data storage services are provided as part of a user plane of a 5G core communication network. 5G communication networks are described further hereinafter.

It will be appreciated, however, that while the 5G communication network is described herein as a use case for applying the teachings of this disclosure, the teachings of this disclosure may be beneficially applied to 4G communication networks, 6G communication networks and other communication network configurations. The core network comprises hardware components, such as servers and switches, and various software modules or components the provide core network functions. When the core network enables a 4G wireless network, the software modules and/or servers may include, for example, Mobility Management Entity (MME), Serving Gateway (SGW), Packet Data Network Gateway (PGW), and Home Subscriber Server (HSS) systems. When the core network enables a 5G wireless network, the software modules and/or servers may include, for example, Access and Mobility Management Function (AMF), Session Management Function (SMF), one or more User Plane Functions (UPFs), and a Unified Data Management (UDM). A 5G core communication network is described further hereinafter with reference to FIG. 3A and FIG. 3B.

As illustrated in FIG. 1, a first data center 102A is communicatively coupled to a second data center 102B via a first fiber optic communication link 104A; the second data center 102B is communicatively coupled to a third data center 102C via a second fiber optic communication link 104B; the third data center 102C is communicatively coupled via a third fiber optic communication link 104C to other data centers which are communicatively coupled to a fourth data center 102D via a fourth fiber optic communication link 104D; the fourth data center 102D is communicatively coupled to a fifth data center 102E via a fifth fiber optic communication link 104E; and the fifth data center 102E is communicatively coupled to a sixth data center 102F via a sixth fiber optic communication link 104F.

While six data centers 102A-102F are illustrated in FIG. 1, it is understood that the system 100 may comprise any number of data centers, for example at least three data centers and less than fifteen data centers, at least five data centers and less than twenty data centers, at least seven data centers and less than thirty data centers, at least ten data centers and less than fifty data centers, at least twenty data centers and less than one hundred data centers. The cut line between third fiber optic communication link 104C and fourth fiber optic communication link 104D is to suggest that there may be additional data centers 102 between the third data center 102C and the fourth data center 102D, each of which are communicatively coupled to each other by fiber optic communication links 104. The network 106 comprises one or more public networks, one or more private networks, or a combination thereof. While illustrated separately in FIG. 1 to aid discussing the data storage system, the data centers 102 and fiber optic links 104 may be considered to be a part of the network 106.

In an embodiment, the data centers 102A-102F are physically aligned in a mostly linear series as illustrated in FIG. 1. The physical locations of the data centers 102A-102F may be disposed across a transit of the United States, for example with the first data center 102A proximate to the east coast and the sixth data center 102B proximate to the west coast. Said in other words, in an embodiment, the data venters 102A-102F may span the United States. In an embodiment, the data centers 102A-102F may each be co-located with a repeater of a fiber optic communication network. In an embodiment, some of the data centers 102A-102F may be co-located with a repeater of the fiber optic communication network and others of the data centers 102A-102F may not be co-located with a repeater of the fiber optic communication network. The repeaters may be considered to be part of the network 106. In an embodiment, each data center 102 is at least 10 miles away from the next nearest data center 102 and less than 100 miles away from the next nearest data center 102. In an embodiment, each data center 102 is at least 10 miles away from the next nearest data center 102 and less than 50 miles away from the next nearest data center 102. In an embodiment, each data center 102 is at least 10 miles away from the next nearest data center 102 and less than 40 miles away from the next nearest data center 102. In an embodiment, each data center 102 is at least 10 miles away from the next nearest data center and less than 35 miles away from the next nearest data center 102. In an embodiment, each data center 102 is at least 20 miles away from the next nearest data center 102 and less than 50 miles away from the next nearest data center 102. In an embodiment, each data center 102 is at least 20 miles away from the next nearest data center 102 and less than 40 miles away from the next nearest data center 102. In an embodiment, each data center 102 is at least 20 miles away from the next nearest data center 102 and less than 35 miles away from the next nearest data center 102. In an embodiment, each data center 102 is at least 20 miles away from the next nearest data center 102 and less than 35 miles away from the next nearest data center.

Each of the data centers 102A-102F is communicatively coupled to the network 106, and hence the data centers 102A-102F are communicatively coupled with each other through a mesh network configuration. The communication links between some or all of the data centers 102A-102F to the network 106 may be provided by fiber optic communication link. The communication links between some or all of the data centers 102A-102F to the network 106 may be provided by a wired communication link, for example via a coaxial cable link. The service users 114 may be customers of a data storage system service provider that provides data storage to the service users 114 on a payment basis. The service users 114 illustrated in FIG. 1 may be workstations or computer systems operated by service subscribers.

Figure 2:
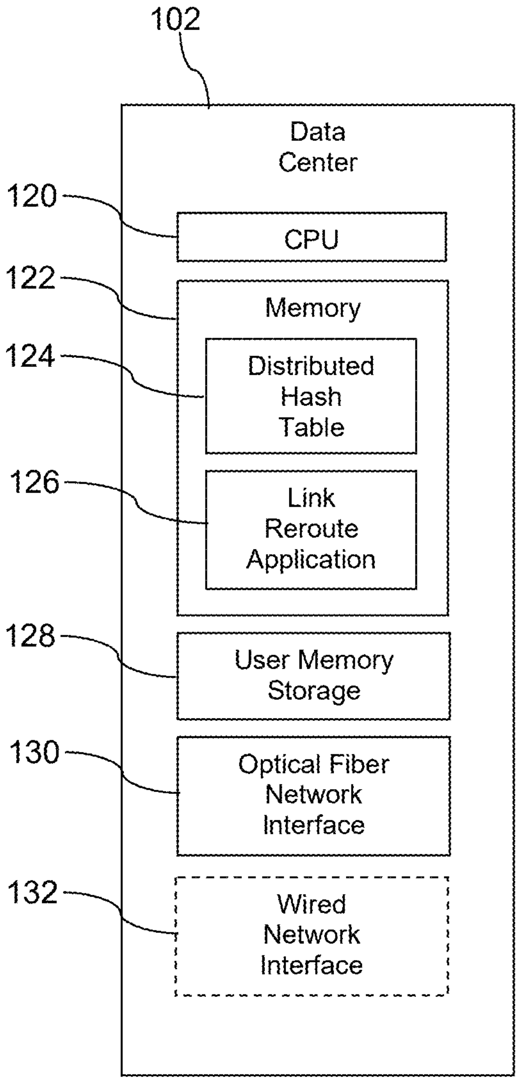
FIG. 2 is a block diagram of a data center according to an embodiment of the disclosure.

Turning now to FIG. 2, an exemplary data center 102 is described. The data center may be implemented as a computer system. Computer systems are described further hereinafter. Each data center 102 may comprise one or more processors 120, a non-transitory memory 122 comprising a distributed hash table (DHT) 124, and a communication link reroute application 126. Each data center 102 further may comprise a user memory storage 128, an optical fiber network interface 130, and an optional wired network interface 132. In an embodiment, the non-transitory memory 122 may include the user memory storage 128. The optical fiber network interface 130 provides communication connectivity to fiber optic communication links 104 and possibly to the network 106. Alternatively, one or more of the data centers 102 may comprise a wired network interface 132 that provides communication coupling from the data center 102 to the network 106.

With reference to both FIG. 1 and FIG. 2, the service users 114 may store data items in the user memory storage 128 of the data centers 102 using content addressing. Content addressing provides a kind of obfuscation of data items such that the type of content stored in a given data item is unclear from its name. For example, the name may be a cryptographic hash calculated over the entire contents of the subject data item. The obfuscation of the data items by using content addressing can make the data items less vulnerable to hacking and/or unauthorized access such as cyber attacks. The data storage service provider may provide an application programming interface (API) to users 114 to employ to store and retrieve data items.

A service user 114 (e.g., a work station or computer in an enterprise domain) may generate a content address for a data item (e.g., a data item name consisting of a cryptographic hash calculated over the full content of the data item) and send the content address and data item via the API to the data storage service provider. Alternatively, the service user 114 may provide the data item, and the data storage service provider may determine the cryptographic hash. The cryptograph hash may be determined with a message digest (MD) cryptographic hash function or with a secure hash algorithm (SHA) cryptographic hash function. In an embodiment, the cryptographic hash may be determined using an MD5 cryptographic hash function. In an embodiment, the cryptographic hash may be determined using a SHA-256 cryptographic hash function. In an embodiment, the cryptographic hash may be determined using a SHA-512 cryptographic hash function. The data storage service provider may store the data item in the user memory storage 128, generate an entry in the Distributed Hash Table (DHT) 124 that maps the content address to the location or locations in the user memory storage 128 where the data item is stored, and return confirmation to the service user 114 that the data item has been stored. The data storage service provider may also return the content address of the data item if the data storage service provider determined the content address.

In an embodiment, the service user 114 may also provide metadata about the data item when initially storing the data item in the user memory storage 128. The metadata may identify the service user 114, a type of file of the data item, a timestamp of the data item, a length of the data item, and/or an expiration date of the data item. The metadata may promote grooming obsolete data items stored in the user memory storage 128 by removing expired data items. The metadata may promote recovering data items of a service user 114 in the event the service user 114 loses the content address of the data item.

The system of data centers 102, the optical fiber communication links 104, the API 110, and the data storage service application 112 may collectively be said to implement a data center storage system integrated with the core network. The system may also be said to implement a data storage service.

In an embodiment, the link reroute application 126 of the data centers 102 is able to detect when an optical fiber communication link 104 has failed and dynamically re-establish communication with an adjacent data center 102, for example via a mesh connection from one data center 102 to the network 106 and from the network 106 back to the adjacent data center 102. Optical fiber communication links 104 are susceptible to fiber cuts, for example as a result of a backhoe excavating in the optical fiber right-of-way.

Figure 3A:
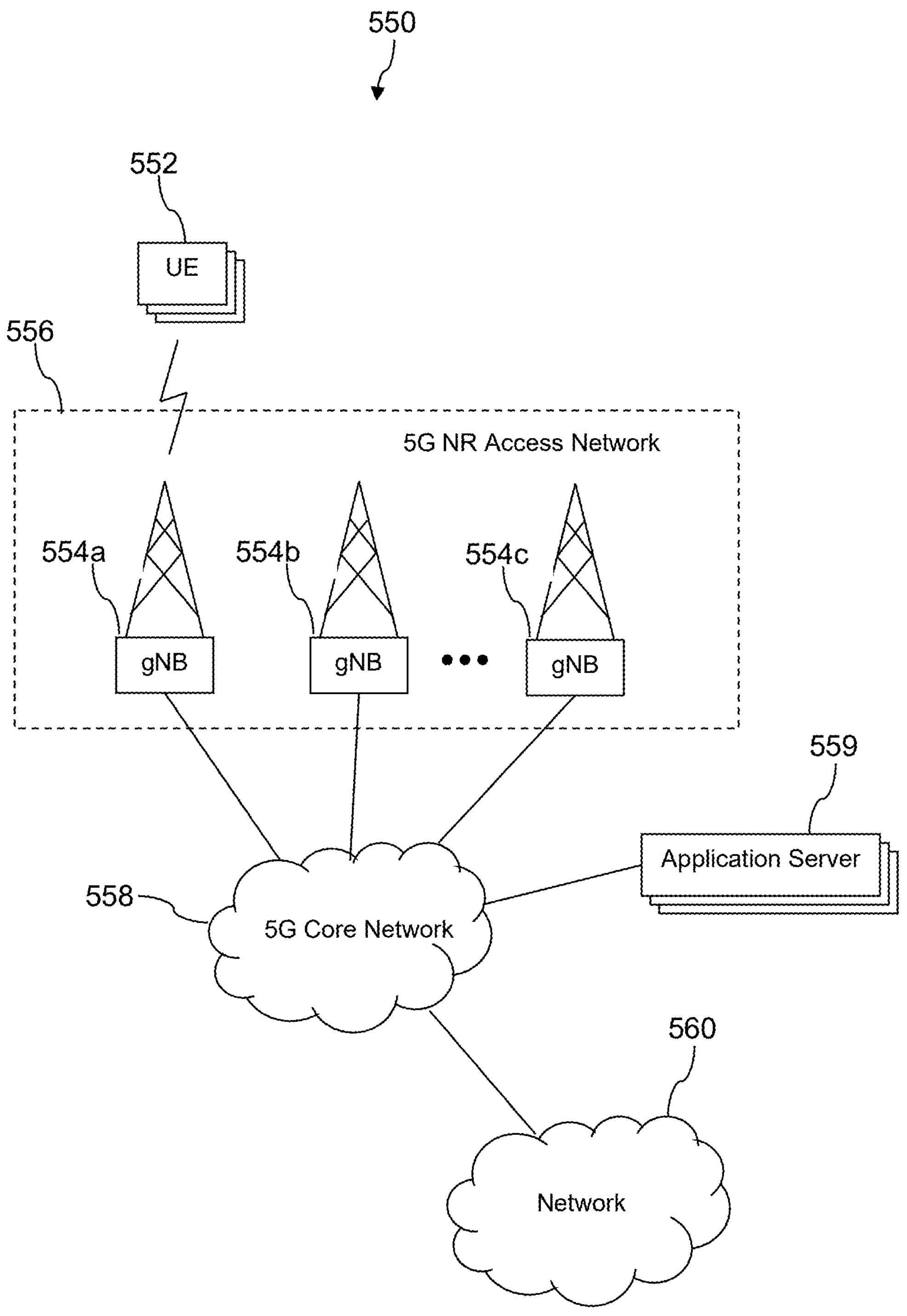
FIG. 3A and FIG. 3B is a block diagram of a 5G communication network according to an embodiment of the disclosure.

Turning now to FIG. 3A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., Code Division Multiple Access (CDMA) and GLOBAL SYSTEM FOR MOBILE COMMUNICATION (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the Public Switched Telephone Network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular Radio Access Technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as Orthogonal Frequency Division Multiplexing (OFDM) and Multiple Input Multiple Output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 3B:
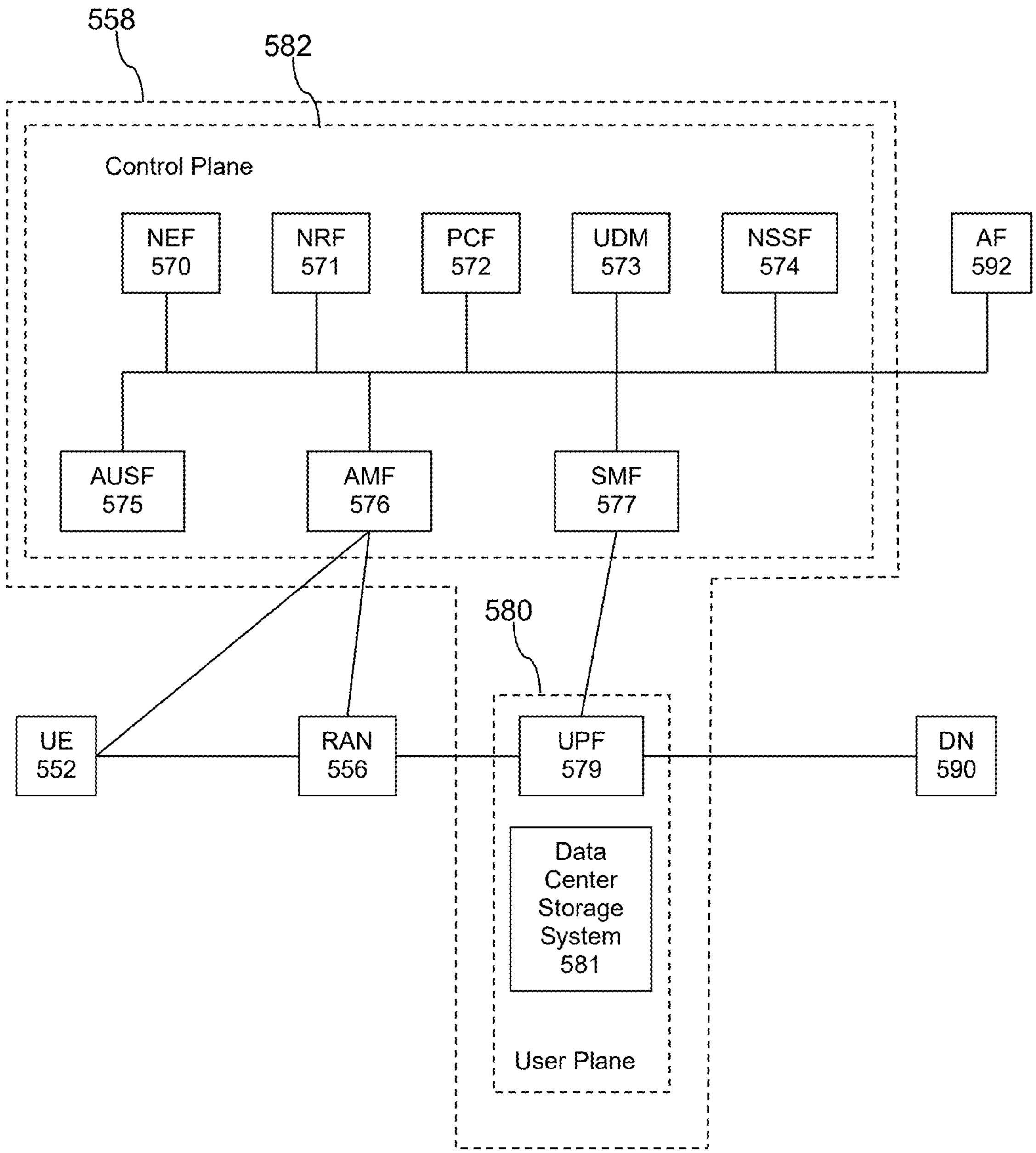

Turning now to FIG. 3B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 3A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

A data center storage system 581 may be considered to be part of the user plane 580. The data center storage system 581 may be considered to comprise the data centers 102, the API 110, and the data storage service application 112 described above with reference to FIG. 1 and FIG. 2. The service users 114 may access the data center storage system 581 via the application function 592 or via a N3 Interworking Function (N3IWF) interface.

Figure 4:
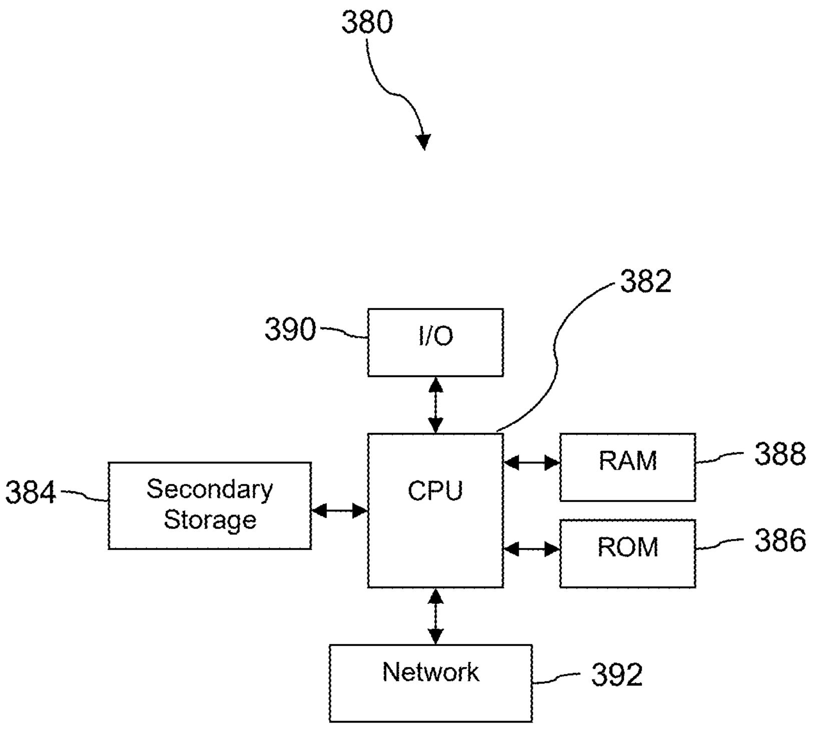
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A data center storage system integrated into a core network, comprising:

a plurality of data centers, wherein each data center provides a memory storage and each data center is at least 10 miles away from a nearest adjacent other data center; and a plurality of optical fiber communication links, wherein each optical communication fiber link communicatively couples two of the plurality of data centers to each other, wherein the memory storage of the plurality of data centers stores a plurality of files, wherein each file is identified by a hash calculated over content of the file, wherein a distributed hash table is stored in the memory storage of each data center that associates hashes of files to a memory storage location where the plurality of files are stored, and wherein each data center is connected to the core network, whereby the memory storage of the plurality of data centers is made available as a user plane function service to end users.

2. The system of claim 1, wherein the memory storage of the plurality of data centers implements an interplanetary file system (IPFS) and the plurality of files are stored in the IPFS.

3. The system of claim 1, wherein when a distributed hash table in one of the plurality of data centers is updated, the distributed hash table of each other data center in the plurality of data centers is also updated.

4. The system of claim 1, wherein each data center is less than 50 miles away from a nearest adjacent other data center.

5. The system of claim 1, wherein the plurality of data centers span the United States.

6. The system of claim 1, wherein at least some of the plurality of data centers are co-located with a repeater of a fiber optic communication network, wherein the fiber optic communication network comprises the plurality of optical fiber communication links.

7. The system of claim 1, wherein the plurality of data centers are communicatively coupled with each other through a mesh network configuration.

8. A data center storage system integrated into a core network, comprising:

a plurality of data centers, wherein each data center provides a memory storage and each data center is at least 10 miles away from a nearest adjacent other data center;

a plurality of optical fiber communication links, wherein each optical fiber communication link communicatively couples two of the plurality of data centers to each other, wherein the memory storage of the plurality of data centers implements an interplanetary file system (IPFS) and stores a plurality of files, wherein each file is identified by a hash calculated over content of the file, wherein a distributed hash table is stored in the memory storage of each data center that associates hashes of files to a memory storage location where the files are stored, and wherein at least some of the files are distributed across each of the plurality of data centers, whereby a vulnerability to hacking the files is decreased, and wherein each data center is connected to the core network.

9. The system of claim 8, wherein the hash calculated over the content of the file is determined using a SHA-256 cryptographic hash function.

10. The system of claim 8, wherein the hash calculated over the content of the file is determined using a SHA-512 cryptographic hash function.

11. The system of claim 8, wherein when a distributed hash table in one of the plurality of data centers is updated, the distributed hash table of each other data center in the plurality of data centers is also updated.

12. The system of claim 8, wherein each data center is less than 50 miles away from a nearest adjacent other data center.

13. The system of claim 12, wherein each data center is at least 25 miles away from a nearest adjacent other data center and less than 35 miles away from a nearest adjacent other data center.

14. The system of claim 8, wherein at least some of the plurality of data centers are co-located with a repeater of a fiber optic communication network, wherein the fiber optic communication network comprises the plurality of optical fiber communication links.

15. A data center storage system integrated into a core network, comprising:

a plurality of data centers, wherein each data center provides a memory storage and each data center is at least 10 miles away from a nearest adjacent other data center;

a plurality of optical fiber communication links, wherein each optical fiber communication link communicatively couples two of the plurality of data centers to each other, wherein the memory storage of the plurality of data centers stores a plurality of files, wherein each file is identified by a hash calculated over content of the file, wherein a distributed hash table is stored in the memory storage of each data center that associates hashes of files to a memory storage location where the files are stored, wherein each data center executes an optical fiber communication link failure application that detects when an optical fiber communication link between the data center and an adjacent data center is failed and re-establishes a communication link with the adjacent data center via an alternate optical fiber communication link, and wherein each data center is connected to the core network, whereby the memory storage of the plurality of data centers is made available as a user plane function service to end users.

16. The system of claim 15, wherein when a distributed hash table in one of the plurality of data centers is updated, the distributed hash table of each other data center in the plurality of data centers is also updated.

17. The system of claim 15, wherein the hash calculated over the content of the file is determined using a MD-5 cryptographic hash function.

18. The system of claim 15, wherein the hash calculated over the content of the file is determined using a SHA-256 cryptographic hash function.

19. The system of claim 15, wherein the hash calculated over the content of the file is determined using a SHA-512 cryptographic hash function.

20. The system of claim 15, wherein at least some of the plurality of data centers are co-located with a repeater of a fiber optic communication network, wherein the fiber optic communication network comprises the plurality of optical fiber communication links.

* * * * *